(12) United States Patent
Tsai et al.

(10) Patent No.: US 7,848,111 B2
(45) Date of Patent: Dec. 7, 2010

(54) SLIDE TYPE ELECTRONIC DEVICE

(75) Inventors: Chu-Chia Tsai, Taipei Hsien (TW);
Wei-Kuo Lee, Taipei Hsien (TW);
Kuo-Kun Lin, Taipei Hsien (TW)

(73) Assignee: Wistron Corporation (TW)

( * ) Notice: Subject to any disclaimer, the term of this patent is extended or adjusted under 35 U.S.C. 154(b) by 192 days.

(21) Appl. No.: 12/358,583

(22) Filed: Jan. 23, 2009

(65) Prior Publication Data
US 2009/0296329 A1 Dec. 3, 2009

(30) Foreign Application Priority Data
May 30, 2008 (TW) .............................. 97120242 A (51) Int. Cl.
*H05K 7/16* (2006.01)
(52) U.S. Cl. ............. 361/727; 361/679.21; 361/679.55; 361/679.56; 455/575.4
(58) Field of Classification Search ................. 361/727, 361/679.01, 679.02, 679.55, 679.21, 679.26, 361/679.3, 679.56; 455/575.4; 341/22; 400/472; 345/168; 248/917
See application file for complete search history.

(56) References Cited

U.S. PATENT DOCUMENTS
2008/0261659 A1* 10/2008 Jang et al. .................... 455/566
* cited by examiner

*Primary Examiner*—Jayprakash N Gandhi
*Assistant Examiner*—Ingrid Wright
(74) *Attorney, Agent, or Firm*—The Mueller Law Office, P.C.

(57) ABSTRACT

A slide type electronic device includes a first device body, a second device body stacked on the first device body, and a slide mechanism provided between the first and second device bodies. The first device body has first and second input interfaces located at different positions. The slide mechanism enables the second device body to slide relative to the first device body in different directions to permit access to one of the first and second input interfaces.

12 Claims, 6 Drawing Sheets

SLIDE TYPE ELECTRONIC DEVICE

CROSS-REFERENCE TO RELATED APPLICATION

This application claims priority of Taiwanese Application No. 097120242, filed on May 30, 2008.

BACKGROUND OF THE INVENTION

1. Field of the Invention

The invention relates to a slide type electronic device, more particularly to a slide type electronic device with a device body that is slidable in more than one sliding direction.

2. Description of the Related Art

Figure 1:
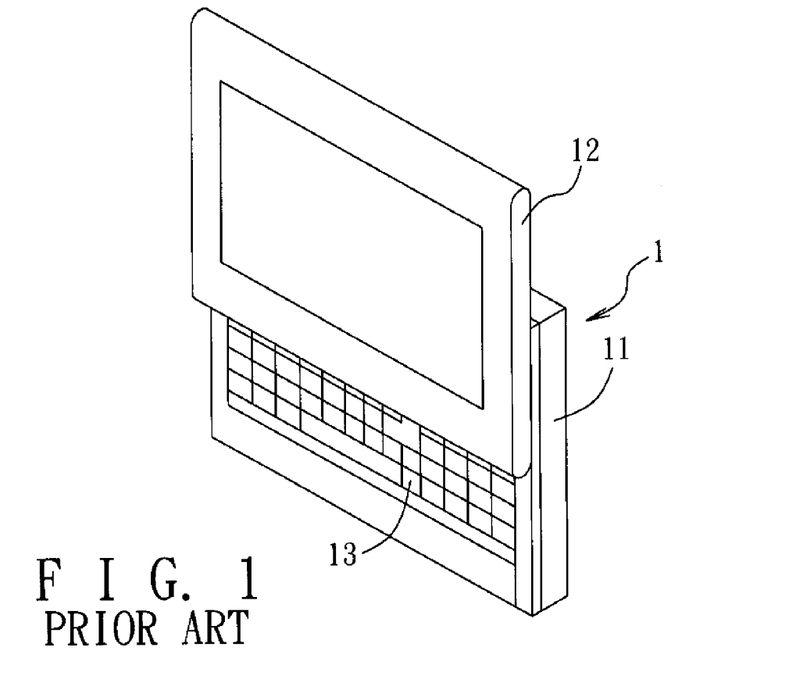
FIG. 1 is a perspective view of a conventional palm-top computer.

FIG. 1 shows a conventional palm-top computer 1 (such as the so-called ultra mobile PC (UMPC), which is exemplified herein by U60 UMPC of Gigabyte Technology Co., Ltd.), which includes an input device body 11 and a display device body 12 stackable on the input device body 11. The input device body 11 has a top face provided with a keyboard unit 13. The display device body 12 is slidable rearwardly relative to the input device body 11 to permit access to the keyboard unit 13.

Figure 2:
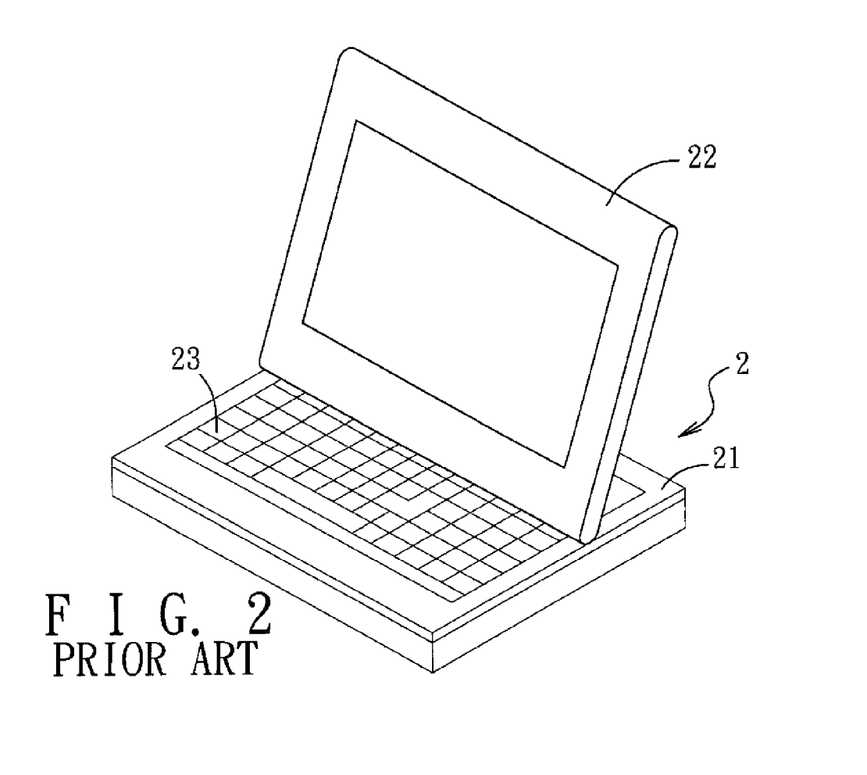
FIG. 2 is a perspective view of another conventional palm-top computer.

Referring to FIG. 2, another conventional palm-top computer 2 (such as the so-called ultra mobile PC (UMPC), which is exemplified herein by U1000 UMPC of Dopod) likewise includes an input device body 21 and a display device body 22 provided on the input device body 21. The input device body 21 has a top face that is also provided with a keyboard unit 23. The display device body 22 is pushable rearwardly relative to the input device body 21 to a standing position.

A structural limitation shared by the computers 1 and 2 of FIGS. 1 and 2 is that, since the keyboard unit 13, 23 on the input device body 11, 21 is located within the space that is exposed after rearward sliding of the display device body 12, 22 disposed above the input device body 11, 21, and since the display device body 12, 22 is slidable generally in a single direction, the space available on the input device body 11, 21 after rearward sliding of the display device body 12, 22 is limited, so that, aside from the arrangement of a standard keyboard to serve as the keyboard unit 13, 23, there is barely any space available for arrangement of other shortcut keys. Furthermore, even if there is some additional space for arrangement of other shortcut keys, in order to use the shortcut keys, the user still needs to push the display device body 12, 22 rearwardly in the same way as using the keyboard unit 13, 23. Thus, the user is not able to quickly and conveniently operate the shortcut keys.

SUMMARY OF THE INVENTION

Therefore, an object of the invention is to provide a slide type electronic device that has a display device body which is slidable in more than one sliding direction so as to permit more convenient operation of shortcut keys.

Accordingly, the slide type electronic device of this invention includes a first device body, a second device body, and a slide mechanism.

The first device body has a top face, first and second outer edges proximate and connected to each other, a first input interface provided on the top face and proximate to the first outer edge, and a second input interface provided on the top face and proximate to the second outer edge. The second device body is stacked on the first device body and has a panel unit and a bottom face.

The slide mechanism includes a slide slot provided in one of the top and bottom faces, and a projecting pin unit provided on the other of the top and bottom faces and slidable along the slide slot. The slide mechanism enables the second device body to selectively slide relative to the first device body substantially along a first direction so as to permit access to the first input interface, and along a second direction so as to permit access to the second input interface.

According to an embodiment of this invention, the first outer edge is a front edge of the first device body, and the second outer edge is one of left and right edges of the first device body. The slide slot includes a first slide slot segment that extends in a left-right direction, and a second slide slot segment that extends substantially in a front-rear direction and that has a rear end connected to the first slide slot segment.

According to an embodiment of this invention, the slide slot is provided in the bottom face of the second device body, and further includes a third slide slot segment spaced apart from and disposed forwardly of the first slide slot segment, and a fourth slide slot segment connected to the first and third slide slot segments. The second device body is slidable leftward and rightward relative to the first device body to permit access to the second input interface when the projecting pin unit is located in one of the first and third slide slot segments. The first input interface is accessible when the projecting pin unit is located in the third slide slot segment.

According to an embodiment of this invention, the second and fourth slide slot segments respectively have front ends that are spaced apart in the left-right direction and that are respectively connected to the third slide slot segment at two points, and respectively have rear ends that are proximate to each other and that are connected to the first slide slot segment.

According to an embodiment of this invention, the slide mechanism further includes a shaft extending in the left-right direction and disposed pivotally on the top face of the first device body. The projecting pin unit is connected to the shaft. The third slide slot segment is proximate to a front edge of the second device body. The second device body is pivotable upwardly relative to the first device body by means of the shaft when the projecting pin unit is located in the third slide slot segment.

According to an embodiment of this invention, the first device body further has a third outer edge, and a third input interface provided on the top face. The second and third outer edges are the left and right edges of the first device body, respectively. The third input interface is proximate to the third outer edge. One of the second and third input interfaces is accessible when the second device body is slid leftward or rightward relative to the first device body.

The slide type electronic device according to this invention includes a first device body, a second device body, and a slide mechanism.

The first device body has a top face, a front edge, left and right edges, and a first input interface, a second input interface, and a third input interface provided on the top face. The first input interface is proximate to the front edge. The second and third input interfaces are proximate to the left and right edges, respectively. The second device body is stacked on the first device body and has a display panel and a bottom face.

The slide mechanism includes a slide slot provided in the bottom face of the second device body, and a projecting pin unit provided on the top face of the first device body and slidable along the slide slot. The slide slot includes a first slide slot segment extending in a left-right direction, a third slide slot segment spaced apart from and disposed forwardly of the first slide slot segment, and a second slide slot segment connected to the first and third slide slot segments. The first and third slide slot segments are provided to allow leftward and rightward sliding of the second device body relative to the first device body so as to permit access to one of the second and third input interfaces. The second slide slot segment is provided to allow rearward sliding of the second device body relative to the first device body so as to permit access to the first input interface.

According to an embodiment of this invention, the slide slot further includes a fourth slide slot segment connected to the first and third slide slot segments. The second and fourth slide slot segments are provided to allow the second device body to slide rearwardly relative to the first device body to permit access to the first input interface. The second and fourth slide slot segments respectively have front ends that are spaced apart in the left-right direction and that are respectively connected to the third slide slot segment at two points, and respectively have rear ends that are proximate to each other and that are connected to the first slide slot segment.

The invention allows the user to choose to slide the second device body in a desired direction depending on the input interface to be used, so that the user may operate the input interface to be used more quickly and more conveniently. In addition, more space is available for use on the first device body for arrangement of other input interfaces, such as keys.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
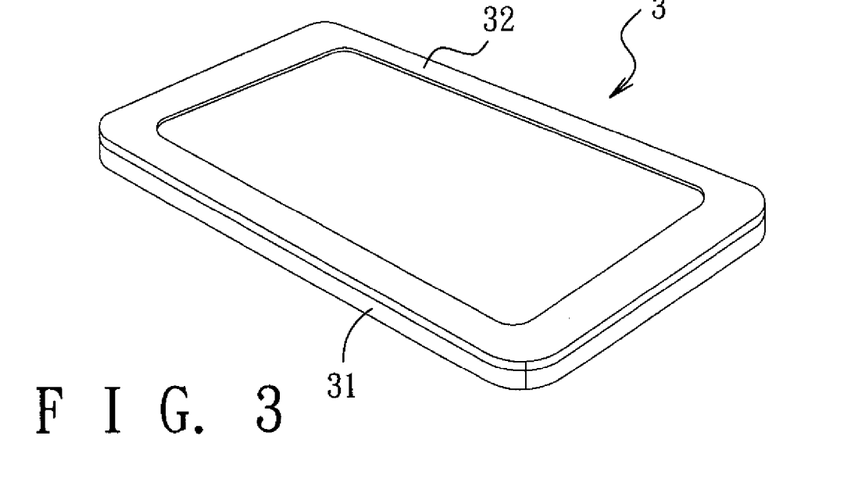
FIG. 3 is a perspective view to illustrate an embodiment of a slide type electronic device according to the invention in a folded state.
Figure 4:
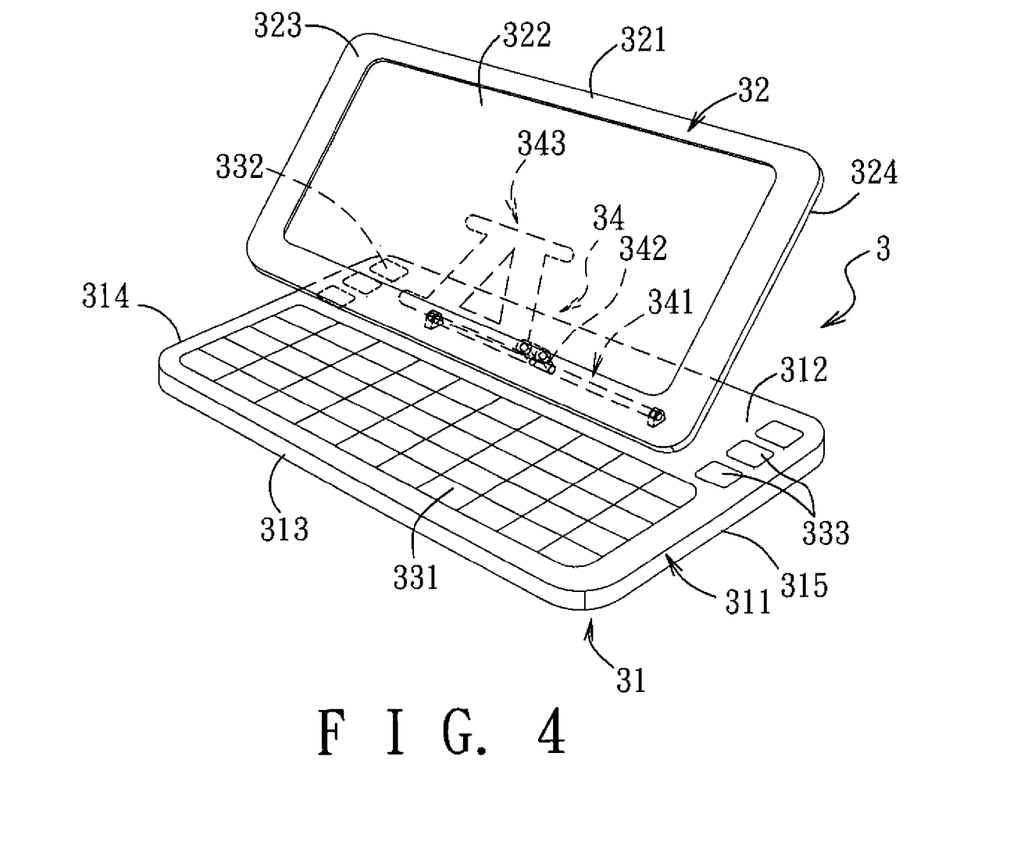
FIG. 4 is a perspective view of the embodiment of the invention in a standing state of use.
Figure 5:
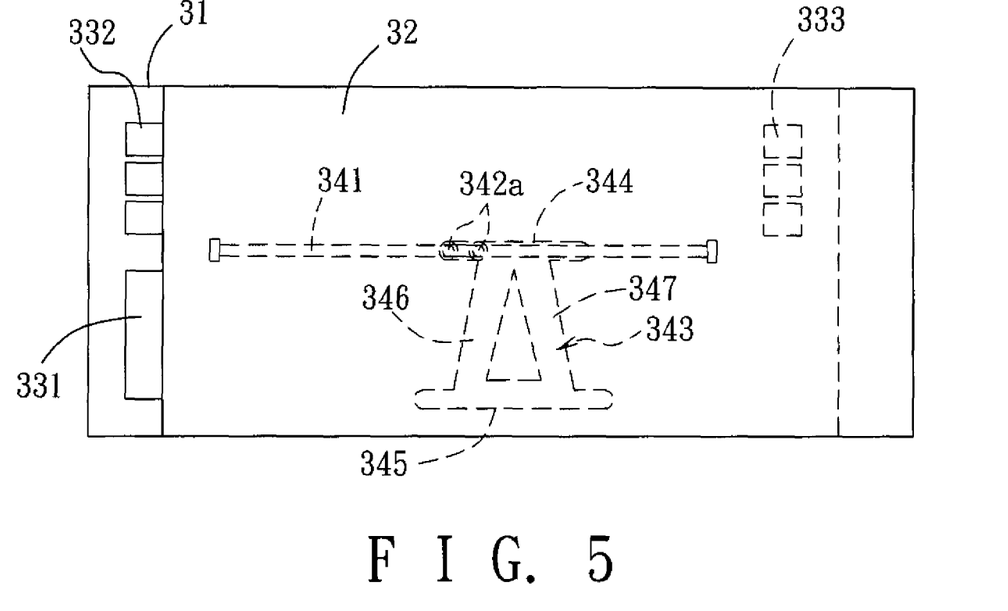
FIG. 5 is an elevational plan view of the embodiment of the invention to illustrate sliding of a second device body relative to a first device body to permit access to a second input interface.

Referring to FIGS. 3 to 5, an embodiment of a slide type electronic device 3 according to this invention is exemplified as a palm-top computer, such as the so-called ultra mobile PC (UMPC). However, the slide type electronic device 3 may also be any other structures, such as a handset, a smart phone, etc., which can be configured as a slide type electronic device in other embodiments of this invention.

The slide type electronic device 3 includes a first device body 31, a second device body 32, and a slide mechanism 34. The first device body 31 is an input device body, and includes a first casing 311, a plurality of electronic components (not shown) provided within the first casing 311, a first input interface 331, a second input interface 332, and a third input interface 333.

The first casing 311 has a top face 312, a first outer edge 313, a second outer edge 314, and a third outer edge 315. In this embodiment, the first outer edge 313 refers to a front edge of the first casing 311. The second and third outer edges 314, 315 respectively refer to left and right outer edges of the first casing 311. The first, second and third input interfaces 331, 332, 333 are provided on the top face 312 of the first casing 311. The first input interface 331 is proximate to the first outer edge 313 of the first casing 311. The second input interface 332 is proximate to the second outer edge 314 of the first casing 311. The third input interface 333 is proximate to the third outer edge 315 of the first casing 311. In this embodiment, the first input interface 331 may be a standard keyboard. Each of the second input interface 332 and the third input interface 333 may include one or more keys. The keys of the second and third input interfaces 332, 333 may be shortcut keys, multimedia playback control keys or other hot function keys. Alternatively, the second and third input interfaces 332, 333 may also be other input interfaces that are not in the form of keys, such as fingerprint identification devices, etc.

The second device body 32 is a display device body that is stacked on the first device body 31 and that includes a second casing 321 and a panel unit 322 provided in the second casing 321. The second casing 321 has a top face 323 and a bottom face 324. The panel unit 322 is exposed from the top face 323 of the second casing 321.

The slide mechanism 34 includes a shaft 341 and a projecting pin unit 342 provided on the first device body 31, and a slide slot 343 provided in the second device body 32. In this embodiment, the shaft 341 extends in a left-right direction, and has two ends disposed pivotally on the top face 312 of the first casing 311 behind the first input interface 331. The projecting pin unit 342 includes two projecting pins (342a) connected to an intermediate section of the shaft 341.

The slide slot 343 is provided in the bottom face 324 of the second casing 321, and includes a first slide slot segment 344 which extends in the left-right direction, a third slide slot segment 345 which is spaced apart from and which is disposed forwardly of the first slide slot segment 344, and a second slide slot segment 346 and a fourth slide slot segment 347, both of which are connected to the first and third slot segments 344, 345. The third slide slot segment 345 is proximate to a front edge of the second casing 321. The second and fourth slide slot segments 346, 347 respectively have front ends that are spaced apart in the left-right direction and that are respectively connected to the third slide slot segment 345 at two points, and respectively have rear ends that are proximate to each other and that are connected to the first slide slot segment 344.

Cooperation between the two projecting pins (342a) and the slide slot 343 is that the projecting pins (342a) extend respectively into and are limited by the slide slot 343 such that the second device body 32 cannot be separated from the first device body 31. In addition, when the second device body 32 is slid relative to the first device body 31, the projecting pins (342a) are slidable along the slide slot 343 such that the second device body 32 is slidable relative to the first device body 31 substantially along a first direction to thereby permit access to the first input interface 331 or along a second direction to thereby permit access to one of the second and third input interfaces 332, 333.

Figure 6:
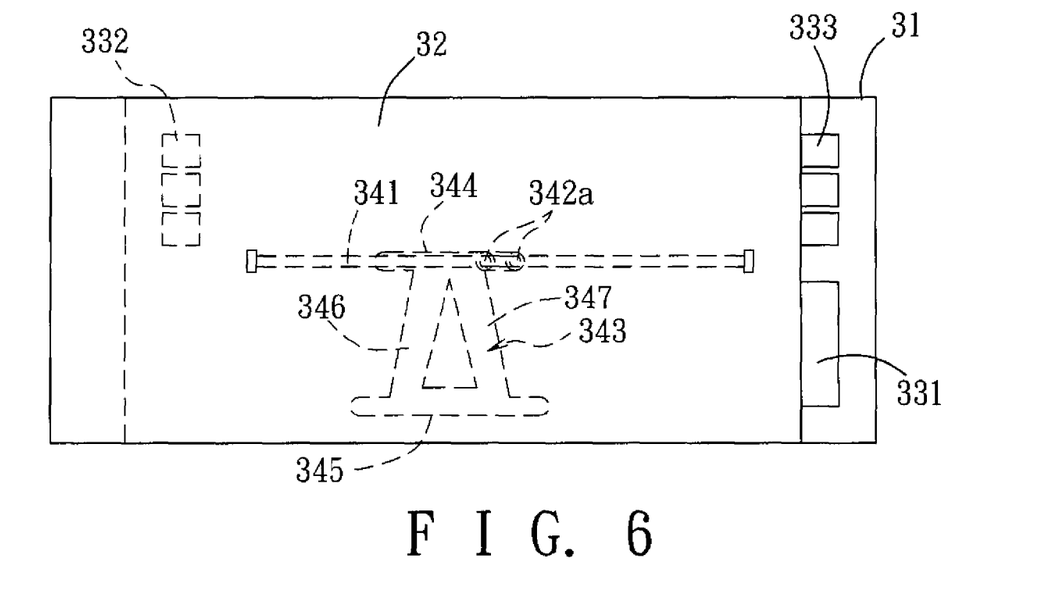
FIG. 6 is an elevational plan view of the embodiment of the invention to illustrate sliding of the second device body relative to the first device body to permit access to a third input interface.

Referring to FIGS. 3, 5 and 6, when the slide type electronic device 3 is disposed in a folded state, the second device body 32 is stacked on the first device body 31, and the projecting pins (342a) are located in the first slide slot segment 344.

When the user desires to use one of the second and third input interfaces 332, 333 that are located respectively on left and right sides of the first device body 31, it is merely necessary to slide the second device body 32 to the left or the right relative to the first device body 31, so that the projecting pins (342a) are slid to a left or right end of the first slide slot segment 344, thereby permitting access to only one of the second and third input interfaces 332, 333 of the first device body 31 for operation. This arrangement facilitates operation in a scenario where the second or third input interface 332, 333 is set as MP3 playback control keys or other shortcut keys, because the user merely needs to slide the second device body 32 in the left or right direction to gain access to control functions set for the MP3 control keys or the shortcut keys. There is no need to expose the entire standard keyboard (i.e., the first input interface 331).

Figure 7:
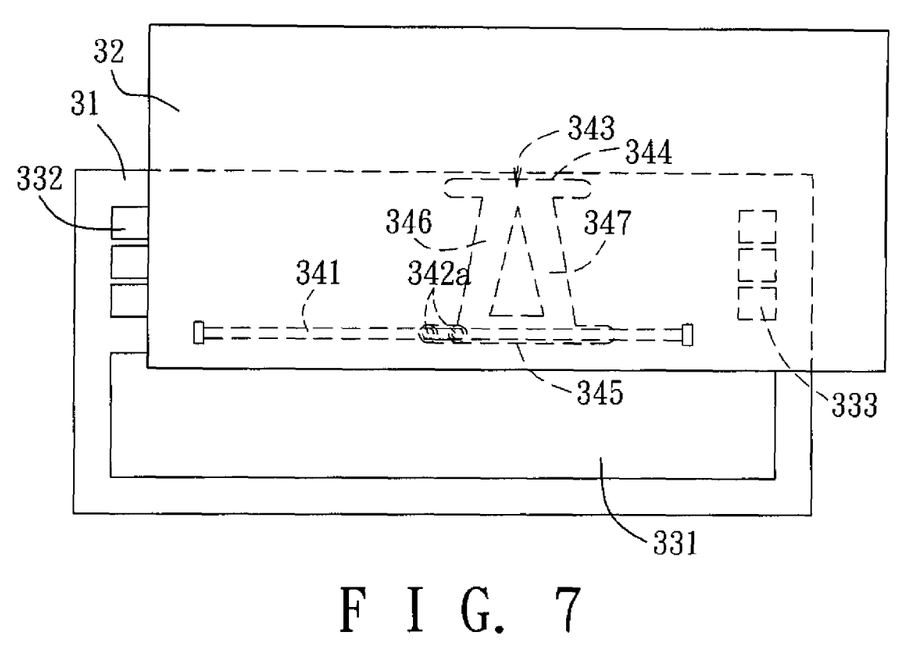
FIG. 7 is an elevational plan view of the embodiment of the invention to illustrate sliding of the second device body relative to the first device body to permit access to a first input interface and the second input interface.
Figure 8:
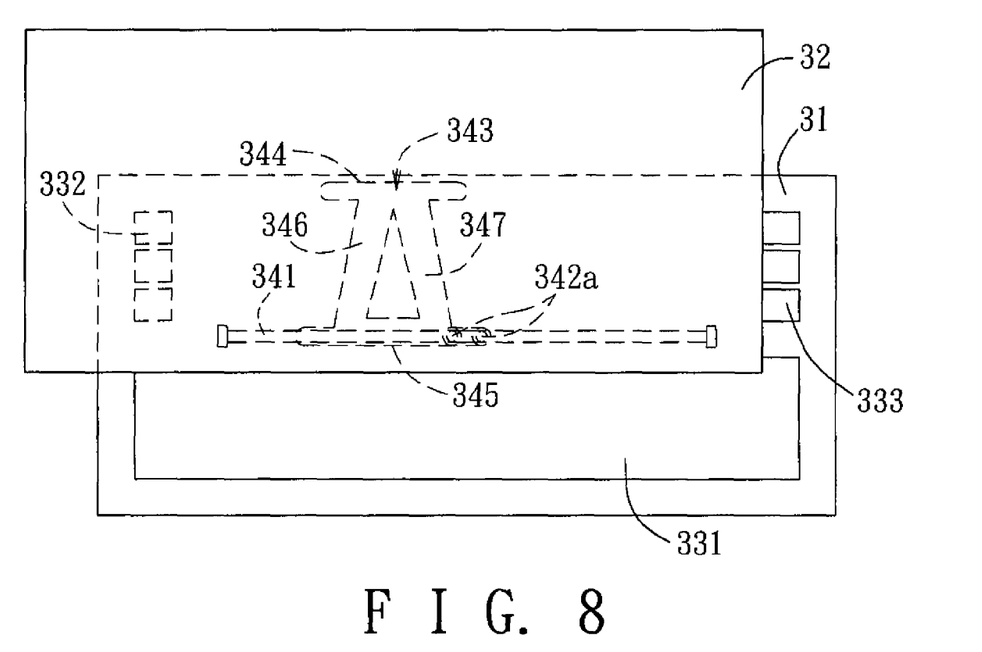
FIG. 8 is an elevational plan view of the embodiment of the invention to illustrate sliding of the second device body relative to the first device body to permit access to the first input interface and the third input interface.

Referring to FIGS. 7 and 8, when the user desires to use the first input interface 331, the second device body 32 is pushed rearwardly relative to the first device body 31 utilizing the projecting pins (342a) that are slidable forwardly along one of the second and fourth slide slot segments 346, 347, thereby permitting access to and operation of the first input interface 331.

Since the second and fourth slide slot segments 346, 347 in this embodiment extend obliquely in a front-rear direction, as shown in FIG. 7, during the process that the second device body 32 is pushed rearwardly relative to the first device body 31, the projecting pins (342a) are slid forwardly along the second slide slot segment 346, so that the second input interface 332 is also accessible at the same time. Therefore, the user may access the second input interface 332 while using the first input interface 331. For the same reason, as shown in FIG. 8, during the process that the second device body 32 is pushed rearwardly relative to the first device body 31, the projecting pins (342a) are slid forwardly along the fourth slide slot segment 347, so that the third input interface 333 is also accessible at the same time. Certainly, no matter whether the second device body 32 is in the state shown in FIG. 7 or 8, the second device body 32 is still slidable leftward and rightward relative to the first device body 31 to permit access to the second input interface 332 or the third input interface 333 depending on the requirements of the user in operation.

Figure 9:
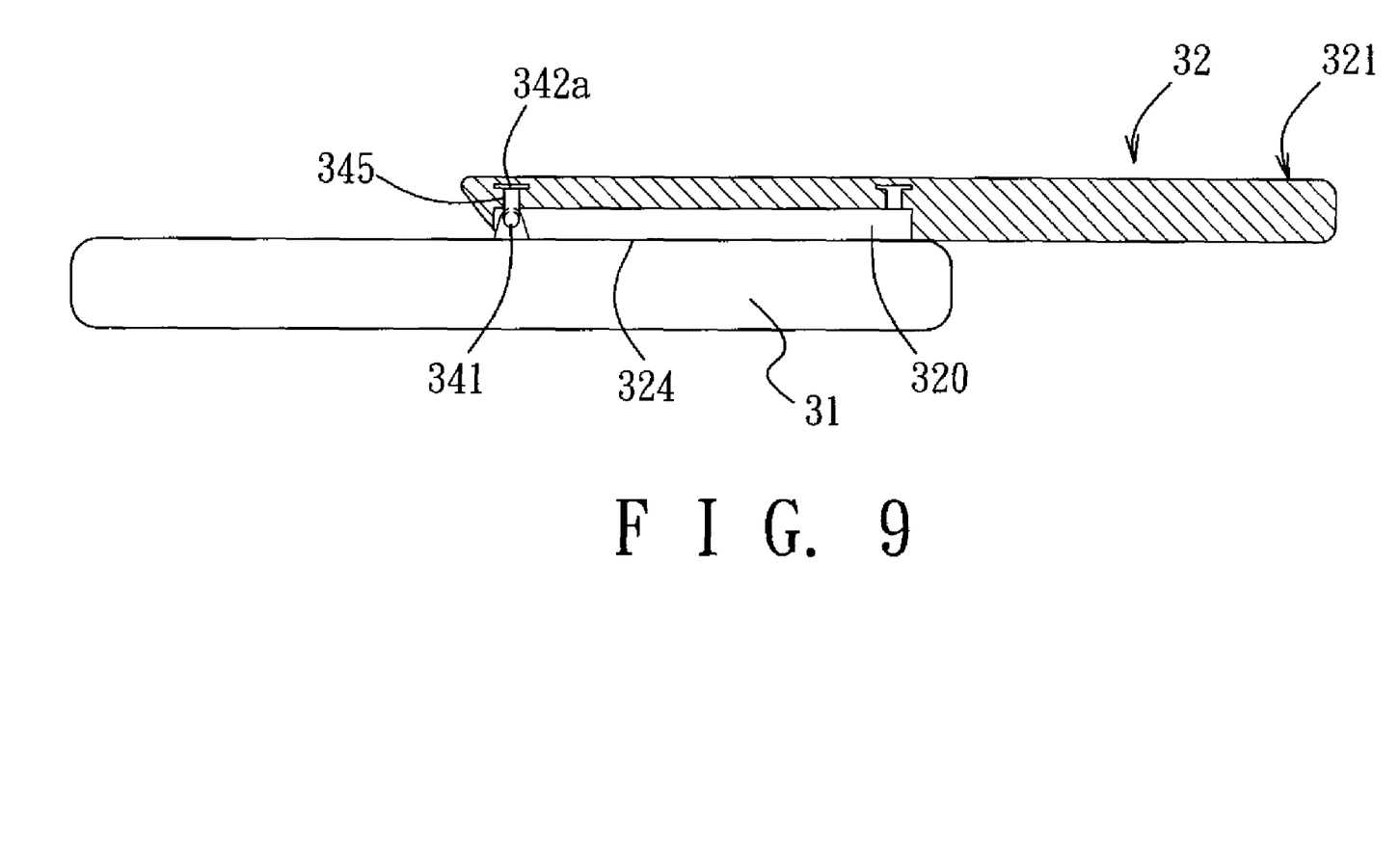
FIG. 9 is a sectional side view of the embodiment of the invention, in which the second device body is yet to be turned uprightly relative to the first device body.
Figure 10:
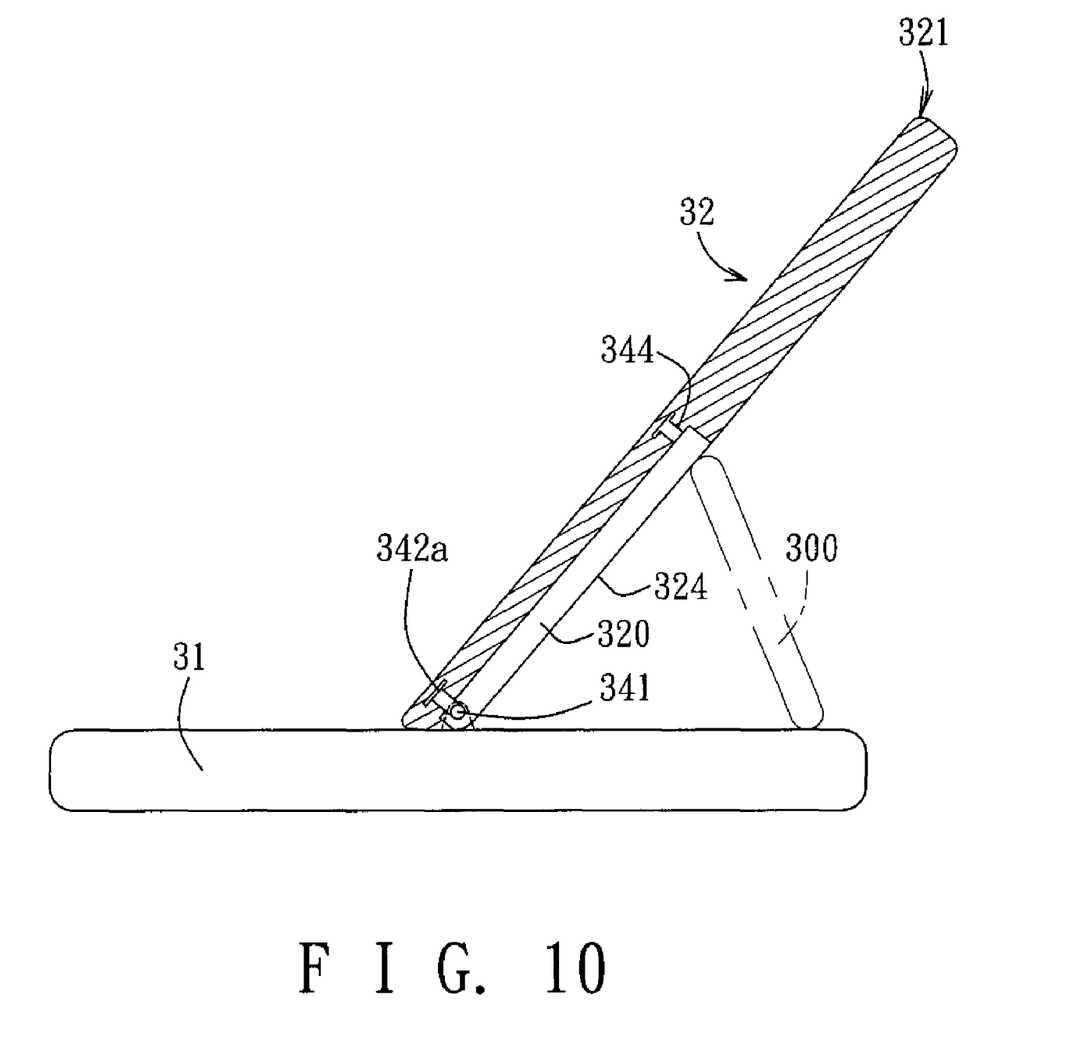
FIG. 10 is a sectional side view of the embodiment of the invention, in which the second device body is turned uprightly relative to the first device body.

Referring to FIGS. 9 and 10, when the electronic device 3 is in the state shown in FIG. 7 or 8, since the two ends of the shaft 341 are disposed pivotally on the first device body 31, and since the projecting pins (342a) are located in the third slide slot segment 345, upward pivoting of the second device body 32 will cause the projecting pins (342a) to bring the shaft 341 to rotate pivotally. The second device body 32 may then be flipped upwardly relative to the first device body 31 to be disposed in a standing state of use, thereby adjusting the angle of the second device body 32 relative to the first device body 31 to facilitate viewing by the user. Furthermore, a support member 300, such as that shown in FIG. 10, may be provided between the second device body 32 and the first device body 31, or other positioning means may be provided to support or position the second device body 32, so as to maintain the second device body 32 in the standing state.

In this embodiment, to accommodate the height or thickness of the shaft 341 provided on the top face 312 of the first device body 31, a portion of the bottom face 324 of the second casing 321 may be configured to have a recess 320 for accommodating the shaft 341, so that the first device body 31 and the second device body 32 will not be unable to be coupled tightly due to the provision of the shaft 341.

It is apparent from the foregoing that the first direction referred to in this embodiment includes the directions of extension of the second slide slot segment 346 and the fourth slide slot segment 347, i.e., the direction in which the second device body 32 is slid rearwardly relative to the first device body 31 to permit access to the first input interface 331, whereas the second direction refers to the direction in which the second device body 32 is slid leftward and rightward relative to the first device body 31.

It is additionally noted that, in this embodiment, the slide slot 343 includes the first to fourth slide slot segments 344, 346, 345, 347. In practice, the number and directions of the first and third slide slot segments 344, 345 and the second and fourth slide slot segments 346, 347 are not limited to the disclosure in this embodiment. The slide slot 343 is provided primarily to enable the second device body 32 to be slidable in more than one direction so that the input interfaces at different locations may be accessible depending on operational requirements, which is unlike the aforementioned prior art devices that are capable of sliding in a single direction only.

In sum, the sliding design according to this invention not only enables the slide type electronic device 3 to be used in a state where the second device body 32 is slid rearwardly to permit access to the first input interface 331, when the user needs to operate the shortcut keys (e.g., the second input interface 332 or the third input interface 333) at the other positions of the first device body 31, it is merely necessary to slide the second device body 32 leftward or rightward relative to the first device body 31 so that the slide type electronic device 3 is usable in a state where access to the second input interface 332 or the third input interface 333 is permitted. Compared to the aforementioned prior art devices which permit sliding in a single direction only, the invention allows the user to choose to slide the second device body 32 in a desired direction depending on the input interface to be used, so that the user may operate the input interface to be used more quickly and more conveniently.

In addition, due to the sliding design according to the invention, the first device body 31 virtually has more space available for arrangement of other shortcut or function keys, so that the shortcut keys do not have to be crammed in the same area of space with the standard keyboard, thereby reducing the possibility of key confusion in operation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A slide type electronic device, comprising:
a first device body having a top face, first and second outer edges proximate and connected to each other, a first input interface provided on said top face and proximate to said first outer edge, and a second input interface provided on said top face and proximate to said second outer edge;
a second device body stacked on said first device body and having a panel unit and a bottom face; and
a slide mechanism including a slide slot provided in one of said top face and said bottom face, and a projecting pin unit provided on the other of said top face and said bottom face and slidable along said slide slot, said slide mechanism enabling said second device body to selectively slide relative to said first device body substantially along a first direction so as to permit access to said first input interface, and along a second direction so as to permit access to said second input interface, wherein said first outer edge is a front edge of said first device body, and said second outer edge is one of left and right edges of said first device body, said slide slot including a first slide slot segment that extends in a left-right direction, and a second slide slot segment that extends generally in a front-rear direction and that has a rear end connected to said first slide slot segment and wherein said slide slot is provided in said bottom face of said second device body, and further includes a third slide slot segment spaced apart from and disposed forwardly of said first slide slot segment, and a fourth slide slot segment connected to said first and third slide slot segments, said second device body being slidable leftward and rightward relative to said first device body to permit access to said second input interface when said projecting pin unit is located in one of said first and third slide slot segments, said first input interface being accessible when said projecting pin unit is located in said third slide slot segment.

2. The slide type electronic device according to claim 1, wherein said second and fourth slide slot segments respectively have front ends that are spaced apart in the left-right direction and that are respectively connected to said third slide slot segment at two points, and respectively have rear ends that are proximate to each other and that are connected to said first slide slot segment.

3. The slide type electronic device according to claim 2, wherein said slide mechanism further includes a shaft extending in the left-right direction and disposed pivotally on said top face of said first device body, said projecting pin unit being connected to said shaft, said third slide slot segment being proximate to a front edge of said second device body, said second device body being pivotable upwardly relative to said first device body by means of said shaft when said projecting pin unit is located in said third slide slot segment.

4. The slide type electronic device according to claim 3, wherein said projecting pin unit includes two projecting pins that are proximate to each other and that are connected to said shaft, said two projecting pins extending into and being limited by said slide slot, and being slidable in said slide slot when said second device body is slid relative to said first device body.

5. The slide type electronic device according to claim 3, wherein said first device body further has a third outer edge, and a third input interface provided on said top face, said second and third outer edges being said left and right edges of said first device body, respectively, said third input interface being proximate to said third outer edge, one of said second and third input interfaces being accessible when said second device body is slid leftward or rightward relative to said first device body.

6. The slide type electronic device according to claim 5, wherein said first input interface is a standard keyboard, said second input interface includes at least one key, and said third input interface includes at least one key.

7. The slide type electronic device according to claim 6, wherein each of said keys of said second and third input interfaces is one of a shortcut key and a multimedia playback control key.

8. A slide type electronic device, comprising:
a first device body having a top face, a front edge, left and right edges, and a first input interface, a second input interface, and a third input interface provided on said top face, said first input interface being proximate to said front edge, said second and third input interfaces being proximate to said left and right edges, respectively;
a second device body stacked on said first device body and having a display panel and a bottom face; and
a slide mechanism including a slide slot provided in said bottom face of said second device body, and a projecting pin unit provided on said top face of said first device body and slidable along said slide slot, said slide slot including a first slide slot segment extending in a left-right direction, a third slide slot segment spaced apart from and disposed forwardly of said first slide slot segment, and a second slide slot segment connected to said first and third slide slot segments, said first and third slide slot segments being provided to allow leftward and rightward sliding of said second device body relative to said first device body so as to permit access to one of said second and third input interfaces, said second slide slot segment being provided to allow rearward sliding of said second device body relative to said first device body so as to permit access to said first input interface, wherein said slide mechanism further includes a shaft extending in the left-right direction and disposed 10 pivotally on said top face of said first device body, said projecting pin unit being connected to said shaft, said third slide slot segment being proximate to said front edge of said second device body, said second device body being pivotable upwardly relative to said first device body by means of said shaft when said projecting pin unit is located in said third slide slot segment and wherein said projecting pin unit includes two projecting pins that are proximate to each other and 28 that are connected to said shaft, said two projecting pins extending into and being limited by said slide slot, and being slidable in said slide slot when said second device body is slid relative to said first device body.

9. The slide type electronic device according to claim 8, wherein said slide slot further includes a fourth slide slot segment connected to said first and third slide slot segments, said second and fourth slide slot segments being provided to enable said second device body to slide rearwardly relative to said first device body to permit access to said first input interface.

10. The slide type electronic device according to claim 9, wherein said second and fourth slide slot segments respectively have front ends that are spaced apart in the left-right direction and that are respectively connected to said third slide slot segment at two points, and respectively have rear ends that are proximate to each other and that are connected to said first slide slot segment.

11. The slide type electronic device according to claim 10, wherein said first input interface is a standard keyboard, said second input interface includes at least one key, and said third input interface includes at least one key.

12. The slide type electronic device according to claim 11, wherein each of said keys of said second and third input interfaces is one of a shortcut key and a multimedia playback control key.

* * * * *